(12) United States Patent
Wesenberg et al.

(10) Patent No.: US 9,296,417 B2
(45) Date of Patent: Mar. 29, 2016

(54) METHOD OF OPERATING A MOTOR VEHICLE WITH A DRIVER ASSISTANCE SYSTEM

(75) Inventors: André Wesenberg, Freising (DE); Michael Redeker, Reichertshofen (DE)

(73) Assignee: AUDI AG, Ingolstadt (DE)

( * ) Notice: Subject to any disclaimer, the term of this patent is extended or adjusted under 35 U.S.C. 154(b) by 7 days.

(21) Appl. No.: 14/117,132

(22) PCT Filed: May 8, 2012

(86) PCT No.: PCT/EP2012/001964
§ 371 (c)(1),
(2), (4) Date: Nov. 12, 2013

(87) PCT Pub. No.: WO2012/156040
PCT Pub. Date: Nov. 22, 2012

(65) Prior Publication Data
US 2014/0074358 A1 Mar. 13, 2014

(30) Foreign Application Priority Data
May 13, 2011 (DE) .......................... 10 2011 101 591

(51) Int. Cl.
*A01B 69/00* (2006.01)
*B62D 6/00* (2006.01)
(Continued)

(52) U.S. Cl.
CPC . *B62D 6/00* (2013.01); *B60R 16/03* (2013.01); *B62D 5/0457* (2013.01); *B62D 5/0481* (2013.01)

(58) Field of Classification Search
CPC ............ B62D 15/0285; B62D 15/025; B60W 2050/0031; B60W 50/14; B60W 10/20; B60W 30/09

USPC .......................... 701/41, 42, 102, 36; 180/443
See application file for complete search history.

(56) References Cited

U.S. PATENT DOCUMENTS

2003/0204294 A1   10/2003   Gluch
2004/0148075 A1*   7/2004   Bullister et al. ................ 701/41
(Continued)

FOREIGN PATENT DOCUMENTS

CN        101790629        7/2010
DE        103 25 484       3/2004
(Continued)

OTHER PUBLICATIONS

International Search Report issued by the European Patent Office in International Application PCT/EP2012/001964 on Jul. 13, 2012.
Chinese Search Report issued by the Chinese Patent Office in counterpart Chinese Patent Application No. 201280023651.1 on Mar. 26, 2015.
(Continued)

*Primary Examiner* — Helal A Algahaim
*Assistant Examiner* — Shardul Patel
(74) *Attorney, Agent, or Firm* — Henry M. Feiereisen LLC.

(57) ABSTRACT

The invention relates to a method of operating a motor vehicle, in which, when at least one predefined driving situation is present, an assigned steering intervention is carried out by a driver assistance system. In advance of such steering interventions, predictions relating to the occurrence of the at least one predefined driving situation are produced as a function of at least one predefined criterion and, as a function of the prediction, at least one operating parameter of the motor vehicle, which is relevant for the steering intervention, is set, before the steering intervention takes place, to a predefined value which is necessary for carrying out the steering intervention. This ensures that when the driving situation takes place, the motor vehicle is in an operating state in which the steering intervention can be executed without interference.

3 Claims, 1 Drawing Sheet

(51) Int. Cl.
*B62D 5/04* (2006.01)
*B60R 16/03* (2006.01)

(56) References Cited

U.S. PATENT DOCUMENTS

| | | | |
|---|---|---|---|
| 2006/0220910 A1* | 10/2006 | Becker et al. | 340/932.2 |
| 2006/0228197 A1* | 10/2006 | Springwater | 414/231 |
| 2007/0055434 A1* | 3/2007 | Kohlmann | 701/100 |
| 2009/0157260 A1* | 6/2009 | Lee | 701/41 |
| 2009/0312910 A1* | 12/2009 | Lemke et al. | 701/41 |
| 2009/0321910 A1* | 12/2009 | Choi | 257/686 |
| 2010/0222984 A1* | 9/2010 | Hauschild et al. | 701/102 |
| 2011/0137524 A1* | 6/2011 | Kim | 701/42 |

FOREIGN PATENT DOCUMENTS

| | | |
|---|---|---|
| DE | 102006007250 | 9/2006 |
| DE | 102006025790 | 12/2007 |
| DE | 102006026404 | 12/2007 |
| DE | 102008033115 | 1/2010 |
| DE | 102009058035 | 8/2010 |
| EP | 1 950 121 | 12/2008 |

OTHER PUBLICATIONS

English translation of Chinese Search Report issued by the Chinese Patent Office in counterpart Chinese Patent Application No. 2012800236511 on Mar. 26, 2015.

* cited by examiner

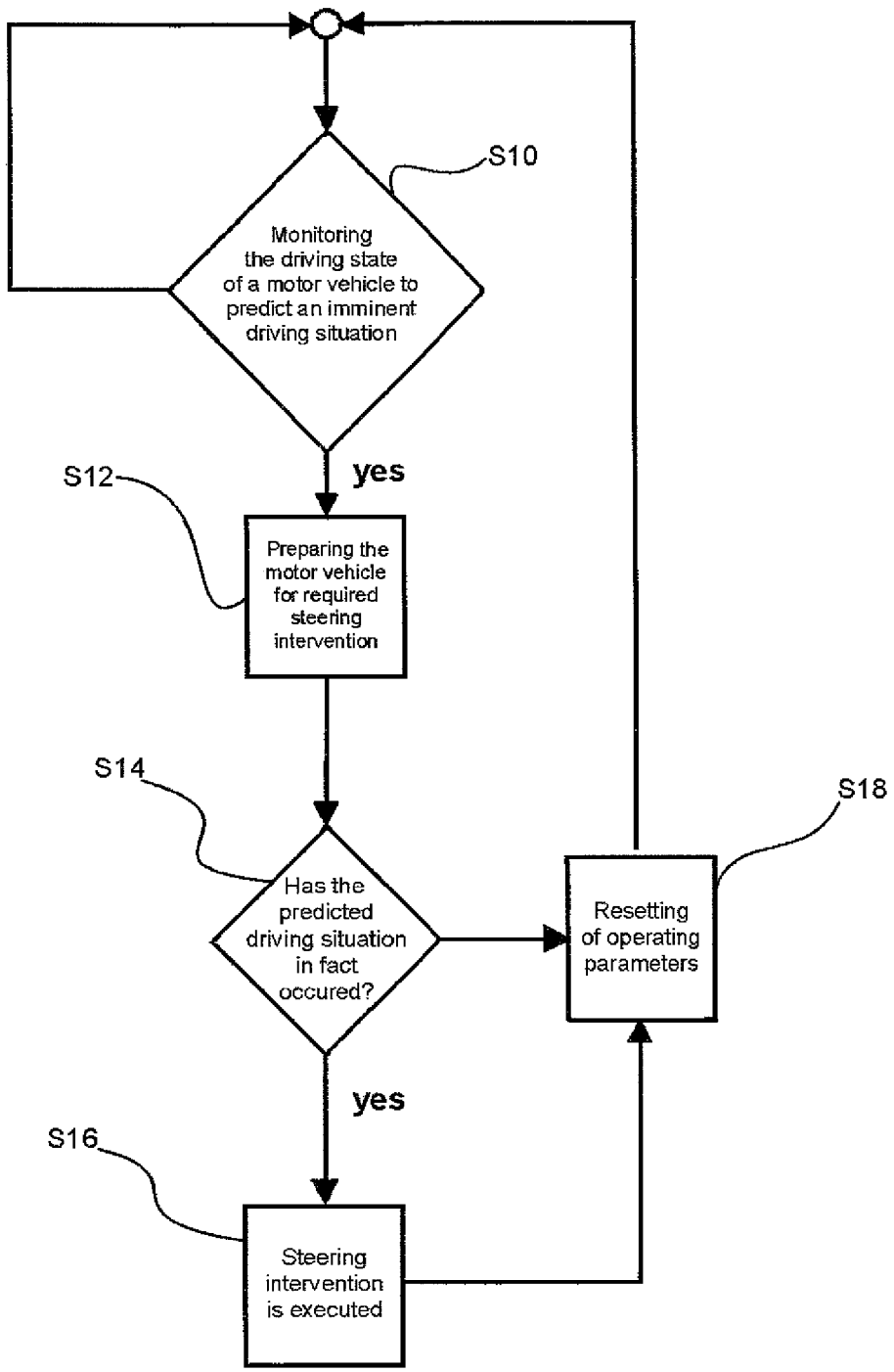

METHOD OF OPERATING A MOTOR VEHICLE WITH A DRIVER ASSISTANCE SYSTEM

CROSS-REFERENCES TO RELATED APPLICATIONS

This application is the U.S. National Stage of International Application No. PCT/EP2012/001964, filed May 8, 2012, which designated the United States and has been published as International Publication No. WO 2012/156040 and which claims the priority of German Patent Application, Serial No. 10 2011 101 591.8, filed May 13, 2011, pursuant to 35 U.S.C. 119(a)-(d).

BACKGROUND OF THE INVENTION

The invention relates to a method of operating a motor vehicle, using a driver assistance system to carry out steering interventions.

Such processes are known in the art: In certain driving conditions, for example during parking, maneuvering, or during lane change, additional torque is applied on the steering by electric steering actuators and intended to assist steering motions by the driver. If need be, the steering may also be executed entirely by the driver assistance system, as is known from automatic parking systems.

In order to be able to provide the desired additional steering torque, the electric steering actuator has to consume energy which is drawn from the on-board power supply of the motor vehicle. If the necessary power cannot be made available, steering intervention cannot be executed to the desired extent or even not implemented at all so that control targets cannot be realized by the driver assistance system and comfort may possibly be adversely affected because steering becomes more difficult. EP 1 950 121 A2 discloses therefore to increase the power output of a generator in the on-board power supply in advance of an imminent steering intervention by providing a certain reactive power. When the steering intervention is then executed, the reactive power is dissipated so that the power rise is less as a result of the steering intervention and the driving comfort is improved. Also in this case, there is no guarantee that the required power is fully made available.

In addition to the described demands on the electrical on-board power supply, further operating parameters of the motor vehicle for such steering interventions are of importance. Examples include the ratio of the steering angle at the axles of the motor vehicle. For example, in a driving situation in which the front and rear axles of the motor vehicle are steered in opposite directions, a steering intervention cannot be readily carried out without delay when a steering of the axles in a same direction is required.

SUMMARY OF THE INVENTION

The present invention is thus based on the object to provide a method of the afore-mentioned type which ensures implementation of desired steering interventions by a driver assistance system in a reliable and comprehensive manner.

This object is attained by a method of operating a motor vehicle in which in the presence of at least one predefined driving situation an assigned steering intervention is executed by a driver assistance system, wherein a prediction with respect to the presence of the at least one predefined driving situation is made in dependence on at least one predefined criterion, and in response to the prediction at least one operating parameter that is relevant for the steering intervention is set, prior to execution of the steering intervention, to a predefined value that is required for executing the steering intervention.

In such a method for operating a motor vehicle, a driver assistance system executes in the presence of at least one predefined driving situation an assigned steering intervention. To ensure a comprehensive execution of the steering intervention, a prediction with respect to the presence of the at least one predefined driving situation is made in dependence on at least one predefined criterion, and in response to the prediction at least one operating parameter that is relevant for the steering intervention is set, prior to execution of the steering intervention, to a predefined value that is required for executing the steering intervention.

Thus, before the steering intervention is carried out, the motor vehicle assumes already an operating state which ensures that the steering intervention can be executed without any interference. This ensures high driving comfort and improves driving safety as a result of a constantly pleasant steering feel. Further, this ensures that control targets preset by the driver assistance system can be reliably realized.

According to a preferred embodiment of the method, the at least one operating parameter that is relevant for the steering intervention involves a power output that is provided by an electric on-board power supply of the motor vehicle. This ensures availability of sufficient power for a steering actuator when executing the steering intervention. The power supply can hereby be adjusted by increase of the power output of a generator in the on-board power supply or decrease in the power drain of other components of the on-board power supply.

It is further of advantage, when a steering angle at a rear axle and/or a front axle of the motor vehicle is selected as the at least one operating parameter that is relevant for the steering intervention. In this way, a steering state of the motor vehicle can be suited to the necessary steering motions already in advance of the steering intervention to be carried out. For example, in driving situations in which front and rear axles of the motor vehicle are steered in opposite directions, a steering intervention can be rapidly initiated when a steering angle in same direction is required.

Preferably, the at least one predefined driving situation is a lane change, a parking procedure, a parking space departure, an evasive action, or a maneuvering procedure. The mentioned driving situations require all relatively severe steering motions so that the assistance from steering interventions by a driver assistance system are especially useful for both driving comfort and driving safety.

BRIEF DESCRIPTION OF THE DRAWING

The invention and its embodiments will now be described in greater detail with reference to the drawing. The sole FIGURE shows hereby a schematic flow chart for an exemplified embodiment of a method according to the invention.

DETAILED DESCRIPTION OF PREFERRED EMBODIMENTS

In order to ensure execution of the desired steering assistance in certain driving situations of a motor vehicle in which a steering assistance is required by an electric steering actuator, the driving state of the motor vehicle is continuously monitored in a first process step S10. To predict forthcoming driving situations, state variables of the steering, in particular a steering wheel angle, a steering wheel angle speed, a superimposing angle of dynamic steering, and the speed of its change as well as a steering torque, are observed.

Also state variables of the drive train, such as the vehicle speed, engine rotational speed, wheel rotational speeds, transmission settings, and the like, can be considered in the prediction. Further relevant variables include the electric system of the vehicle. Of importance in this context are in particular the on-board voltage and information about events in the electric system of the motor vehicle, like, for example, the actuation of a starter, the activity of an automatic start-stop control, and the like. Also, activation of driver assistance systems, for example a parking help, by the driver may enter into the prediction.

Finally, also environmental information, like for example the geographic position of the motor vehicle, measuring data of distance sensors, or surround cameras, and the like may enter into the monitoring.

When determining on the basis of the monitored operating parameters that a particular driving situation, like, for example, the presence of a lane change, an evasive maneuver, parking process, parking space departure, or maneuvering procedure, is imminent, the following process step S12 takes measures to prepare the motor vehicle for steering interventions that are required in this driving situation.

It is in particular ensured in this process step that the on-board power supply of the motor vehicle is capable to provide the electric power necessary to execute the steering intervention. This may involve both the power output of a generator in the on-board power supply and the decrease in power drain of non-essential consumers in the on-board power supply. To ensure the necessary power by the generator, a respective additional torque may further be provided by the internal combustion engine of the motor vehicle. The electric steering actuator is thus supplied with the necessary power when the predicted driving situation occurs. Also the steering angle of a rear axle can be adjusted in step S12 to enable or facilitate the impending steering intervention.

These adjustments are followed by process step S14 in which a check is performed as to whether the predicted driving situation has in fact occurred. If this is the case, the necessary steering intervention is executed in step S16 by the electric steering actuator to cope with the driving situation. After conclusion of the steering intervention, the operating variables of the motor vehicle as changed in step S12 are reset in step S18 to their original values or again transferred to an independent open-loop control or closed-loop control. Subsequently, it is again reverted back to step S10 to monitor the driving state.

In the event, the predicted driving situation does not occur, step S18 can follow immediately—possibly after a certain waiting period.

The invention claimed is:

1. A method of operating a motor vehicle; comprising: monitoring with sensors installed in the motor vehicle a driving state of the motor vehicle; predicting the occurrence of at least one predefined diving situation of the motor vehicle based on the driving state in dependence on at least one predefined criterion; setting at least one operating of the motor vehicle that is relevant for a steering intervention in response to the prediction to a predefined value that is required for executing the steering intervention; and automatically executing the steering intervention by actuating with a driver assistance system a steering actuator as a function of the predefined value required for executing the steering intervention before the execution of the steering intervention, wherein the at least one operating parameter required for the steering intervention is a steering angle on at least one of a rear axle and a front axle of the motor vehicle.

2. The method of claim 1, wherein the at least one operating parameter required for the steering intervention further comprises a power output provided in an electric on-board power supply of the motor vehicle.

3. The method of claim 1, wherein the at least one predefined driving situation involves the presence of a lane change, a parking procedure, a parking space departure, an evasive action, or a maneuvering procedure.

* * * * *